United States Patent
Shimizu et al.

[11] Patent Number: 5,996,723
[45] Date of Patent: Dec. 7, 1999

[54] CABLE-TYPE STEERING DEVICE

[75] Inventors: Yasuo Shimizu; Hiroshi Tabata, both of Wako, Japan

[73] Assignee: Honda Giken Kogyo Kabushiki Kaisha, Tokyo, Japan

[21] Appl. No.: 08/917,077

[22] Filed: Aug. 25, 1997

[30] Foreign Application Priority Data

Aug. 26, 1996 [JP] Japan ................................. 8-223467
Aug. 26, 1996 [JP] Japan ................................. 8-223468

[51] Int. Cl.$^6$ ........................................... B62D 5/00
[52] U.S. Cl. .................... 180/444; 280/771; 242/587.1
[58] Field of Search ........................... 280/771; 180/443, 180/444, 446, 400; 242/125.1, 587.1; 74/388 R, 388 PS, 487, 500.2, 502.3, 506

[56] References Cited

U.S. PATENT DOCUMENTS

| | | | |
|---|---|---|---|
| 1,533,556 | 4/1925 | Howard | 242/587.1 |
| 2,573,209 | 10/1951 | Macpherson | 242/587.1 |
| 2,846,162 | 8/1958 | Allin, Sr. et al. | 242/587.1 |
| 3,181,390 | 5/1965 | Juy | 242/125.1 |
| 4,519,556 | 5/1985 | Timoschuk | 242/125.1 |
| 4,526,050 | 7/1985 | Johnson | 74/506 |
| 4,602,751 | 7/1986 | Vogel | 242/125.1 |
| 5,598,897 | 2/1997 | Sugiura | 180/417 |

*Primary Examiner*—Kevin Hurley
*Attorney, Agent, or Firm*—Armstrong, Westerman, Hattori, McLeland & Naughton

[57] ABSTRACT

A cable-type steering device having a steering wheel 1, a gear box and Bowden wires connecting the steering wheel 1 and the gear box. Pins fixed to a tip end of inner cables of the Bowden wires are fixed to pin holes formed on end surfaces of a drive pulley. The inner cables connected to the pins are inserted and fitted into wire fixing grooves having a spiral or wavy pattern shape formed on the end surfaces of the drive pulley. The inner cables are then wound around a pulley groove formed on a peripheral surface of the drive pulley. A tensional force of the inner cables is supported by the friction force generated between the inner cables and the wire fixing grooves and the load force applied to the portion fixing the pins to the inner cables is substantially reduced.

7 Claims, 10 Drawing Sheets

CABLE-TYPE STEERING DEVICE

BACKGROUND OF THE INVENTION

1. Field of the Invention

The present invention relates to a cable-type steering device comprising a steering wheel and a gear box which are connected to each other by a flexible cable such as a Bowden wire.

2. Description of Related Art

A conventional steering device for a vehicle has a structure such that a lower end of a steering shaft having a steering wheel at an upper end thereof is connected to a gear box and a steering torque input to the steering wheel is transmitted through the steering shaft to a rack and pinion mechanism provided within the gear box.

However, when the steering wheel and the gear box are connected to each other by using the steering shaft, it is difficult to optionally select a relative position of the steering wheel with respect to a position of the gear box so that there are problems in that a design choice is greatly limited and the gear box can not be commonly used for a vehicle having a steering wheel in a right side and for a vehicle having a steering wheel in a left side. Further, since a vibration transmitted to a tire from a road surface and a vibration of an engine are input to the steering wheel through the steering shaft, there is a problem that a minimal sound level within the vehicle cabin and desired comfort level are difficult to achieve due to the vibrations.

Accordingly, cable-type steering device employing a flexible transmitting means such as a Bowden wire has been suggested in place of the conventional steering shaft (refer to U.S. Pat. No. 5,598,897).

By applying this structure, it is possible to optionally select a relative position of the steering wheel with respect to a position of the gear box and further vibration of the gear box is not readily transmitted to the steering wheel so that the above described problems are avoided.

In the above mentioned conventional structure, a fixing portion between an end of the wire and a pulley is formed by fixing a pin which is mounted to the end of the wire by casting or caulking to a pin hole formed on the end surface of the pulley. In this structure, when the pulley is rotated so as to unwind the wire, there is a possibility that a tensional force on the wire directly effects the pin so that durability and expected service life of the fixing portion is reduced.

SUMMARY OF THE INVENTION

The present invention is made by taking the above described problems in the conventional steering device into consideration and an object of the present invention is to improve durability by reducing the force applied to a fixing portion between an end of a wire and a pulley.

In order to obtain the above described object, in accordance with a first aspect of the present invention, there is provided a cable-type steering device comprising a drive pulley connected to a steering wheel and having a spiral pulley groove, a driven pulley connected to a gear box which steers a vehicle wheel and having a spiral pulley groove, a wire having two ends which are respectively wound around the spiral pulley groove of the drive pulley and the spiral pulley groove of the driven pulley, pins respectively fixed to the ends of the wire, pin holes respectively formed in the drive pulley and the driven pulley and fixing the pins, the wire transmitting a steering torque input to the steering wheel to the gear box, a wire fixing groove connecting each of the pin holes to each of the pulley grooves is formed on each of the end surfaces of the drive pulley and the driven pulley at least along a central angle of 90 degrees, and a portion of each end of the wire is inserted into one of the wire fixing grooves. In accordance with the above described structure, a tensional force of the wire can be supported by a frictional force generated between the wire and the wire fixing groove so that an application of the load force into the fixing portion between the wire and the pin can be avoided.

In this case, if the wire fixing groove is formed as a spiral shape or the wire fixing groove is formed as a wavy pattern, a wire fixing groove having a sufficient length can be formed in a limited area of the end surfaces of the drive pulley and the driven pulley.

Further, in order to obtain the above described object, in accordance with a second aspect of the present invention, there is provided a cable-type steering device comprising a drive pulley connected to a steering wheel and having a spiral pulley groove, a driven pulley connected to a gear box which steers a vehicle wheel and having a spiral pulley groove, a wire having two ends which are respectively wound around the spiral pulley groove of the drive pulley and the spiral pulley groove of the driven pulley, pins respectively fixed to the ends of the wire, pin holes respectively formed in the drive pulley and the driven pulley and fixing the pins, the wire transmitting a steering torque input to the steering wheel to the gear box, the wire is wound around one of the spiral pulley grooves at two or more times when the steering wheel is rotated to its maximum limit of rotation in one direction tending to unwind the wire from that spiral pulley groove.

In accordance with the above described structure, a tensional force of the wire can be supported by a frictional force generated between the wire remaining wound and the pulley groove so that an application of the load force into the fixing portion between the wire and the pin can be avoided.

Furthermore, in order to obtain the above described object, in accordance with a third aspect of the present invention, there is provided a cable-type steering device comprising a drive pulley connected to a steering wheel and having a spiral pulley groove, a driven pulley connected to a gear box which steers a vehicle wheel and having a spiral pulley groove, a wire having two ends which are respectively wound around the spiral pulley groove of the drive pulley and the spiral pulley groove of the driven pulley, pins respectively fixed to the ends of the wire, pin holes respectively formed in the drive pulley and the driven pulley and fixing the pins, the wire transmitting a steering torque input to the steering wheel to the gear box, and at least one end portion of the wire is doubly wound around one of the spiral pulley grooves when the steering wheel is rotated to its maximum limit of rotation in a direction tending to unwind the wire from that spiral pulley groove.

In accordance with the above described structure, a tensional force of the wire can be supported by a frictional force generated between the doubly wound wire on the pulley groove so that an application of the load force into the fixing portion between the wire and the pin can be avoided.

In this case, if at least a portion of the wire is doubly wound in a radial direction of the drive pulley or the driven pulley or an axial direction thereof, a friction force can be generated between the wire abutting against itself.

The above described and further objects, features and advantages of the invention will become apparent by the following explanation of preferred embodiments of the invention with reference to the attached drawings.

DETAILED DESCRIPTION OF THE PREFERRED EMBODIMENTS

A first embodiment of the present invention will be explained with reference to FIGS. 1 to 5.

Figure 1:
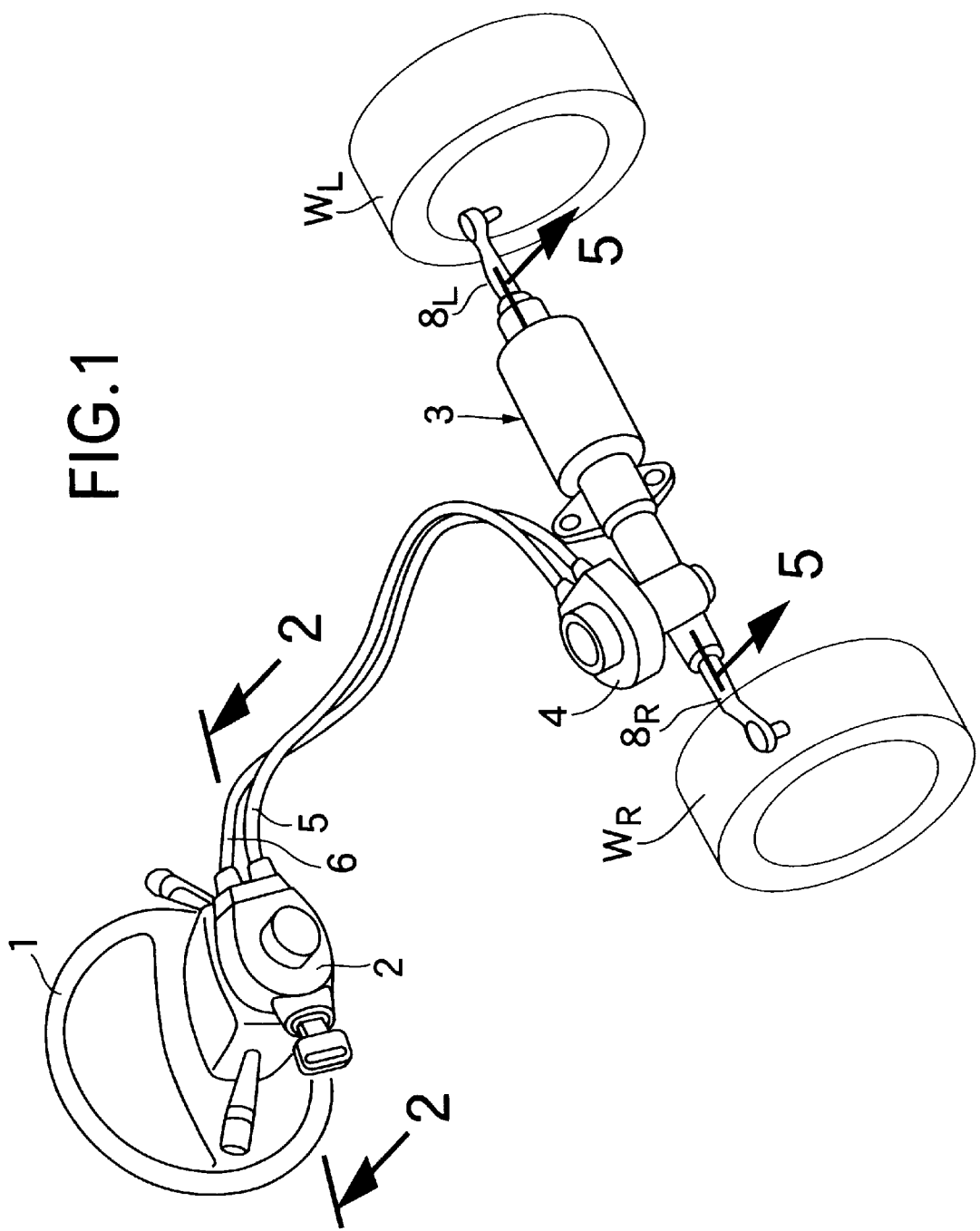
FIG. 1 is a perspective view which shows a steering device for a vehicle according to a first embodiment of the invention.

As shown in FIG. 1, a drive pulley housing 2 provided in a forward portion of a steering wheel 1 of the vehicle is connected to a driven pulley housing 4 provided in a gear box 3 by two Bowden wires 5 and 6. Tie rods $8_L$ and $8_R$ extending in a right and left (lateral) direction of the vehicle body from both ends of the gear box 3 are connected to knuckles (not shown) for supporting left and right wheels $W_L$ and $W_R$.

Figure 2:
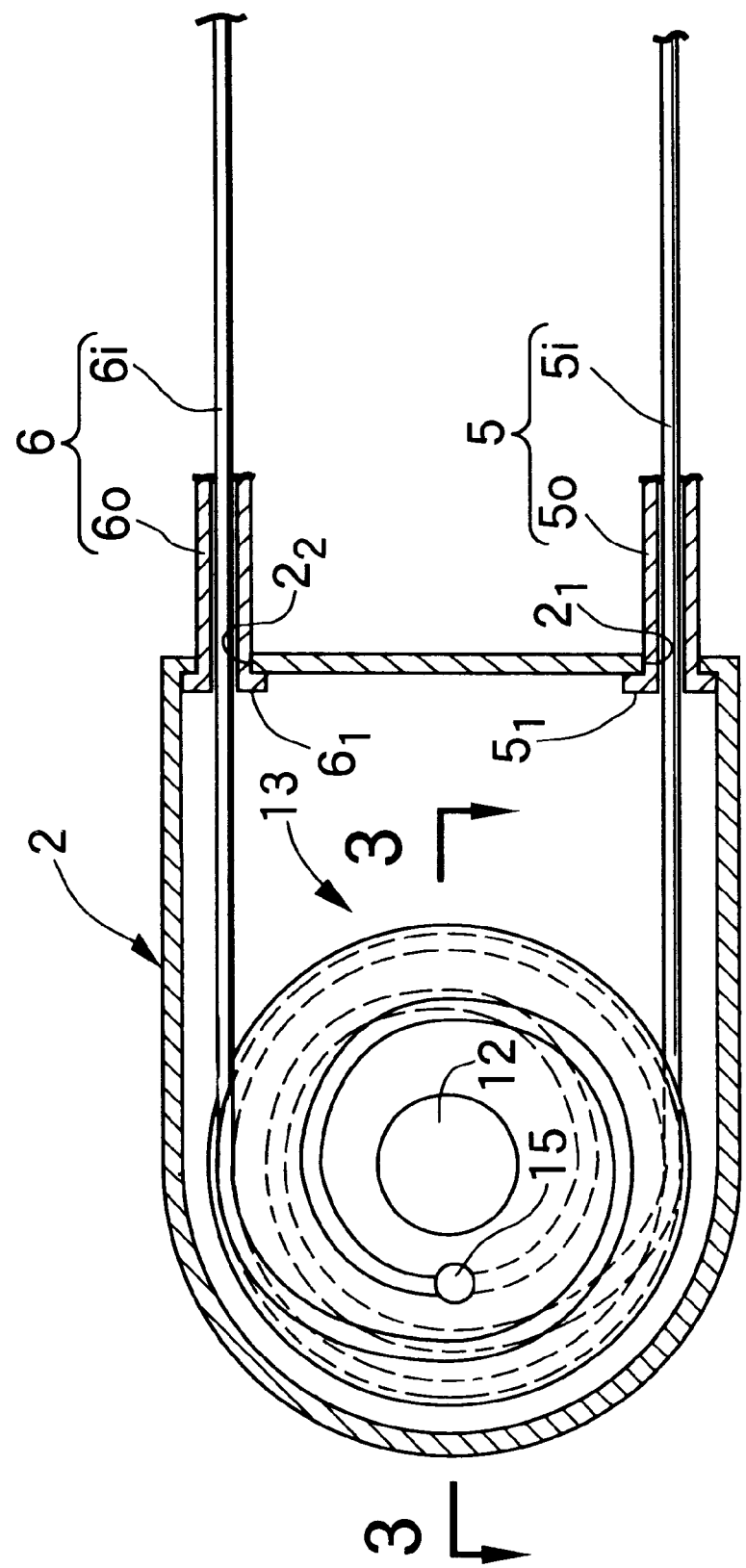
FIG. 2 is an enlarged cross sectional view taken along a line 2—2 in FIG. 1.

As shown in FIG. 2, a drive pulley 13 is fixed to a rotary shaft 12 which is rotatably supported to the drive pulley housing 2 and rotates together with the steering wheel 1. The Bowden wire 5 comprises an outer tube 5o and an inner cable 5i slidably received within the outer tube 5o. Similarly, the Bowden wire 6 comprises an outer tube 6o and an inner cable 6i slidably provided within the outer tube 6o.

One end or each of the inner cables 5i and 6i is fixedly wound around an outer periphery of the drive pulley 13 and one end of each of the outer tubes 5o and 6o extends through a corresponding cable through hole $2_1$ or $2_2$ formed in the drive pulley housing 2 and each of the flange portions $5_1$ and $6_1$ is fixed to an internal surface of the drive pulley housing 2.

Figure 3:
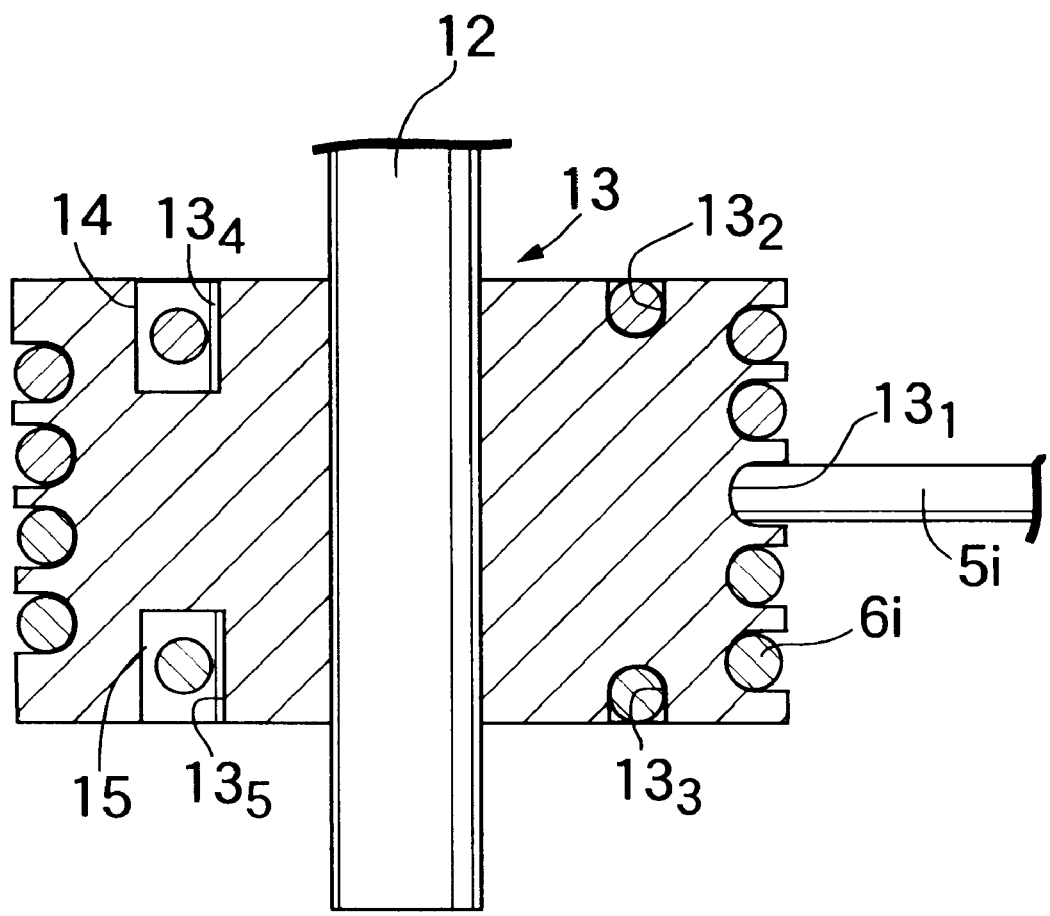
FIG. 3 is a cross sectional view taken along a line 3—3 in FIG. 2.
Figure 4:
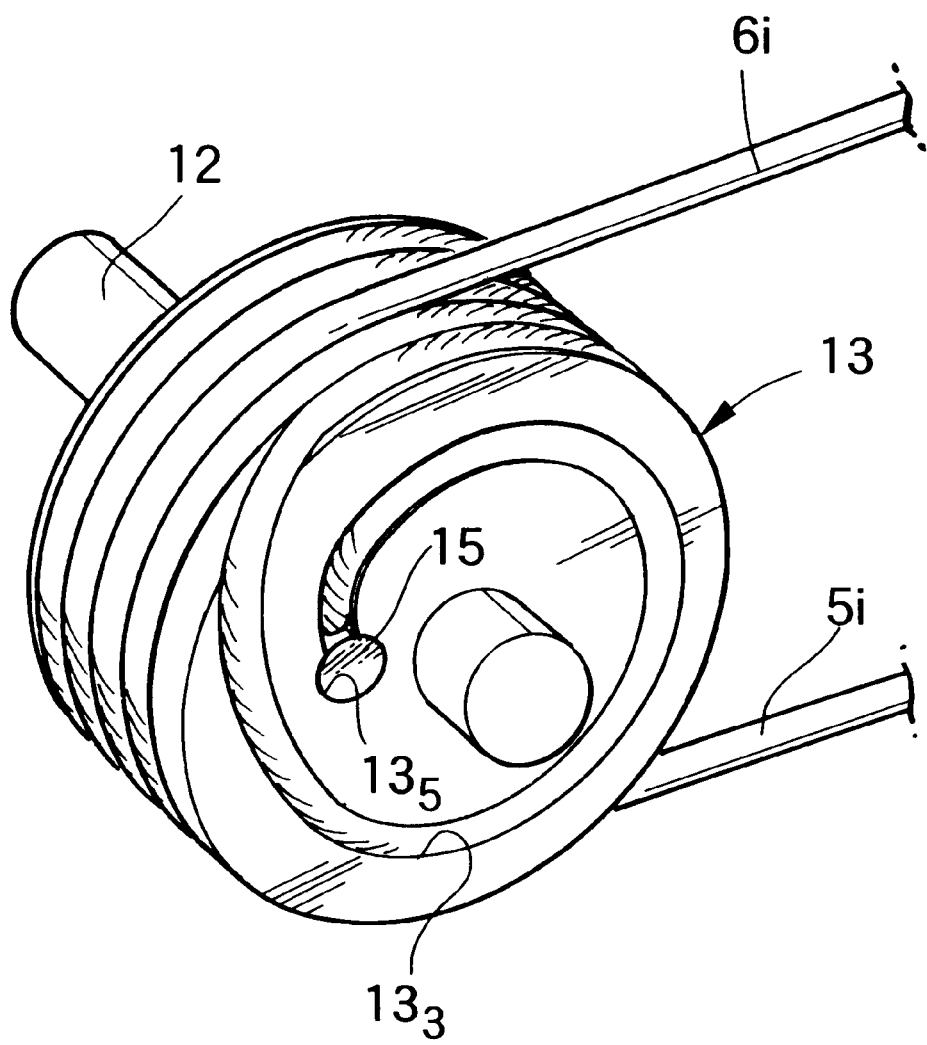
FIG. 4 is a perspective view which shows a drive pulley.

As clearly shown in FIGS. 2 to 4, on the outer peripheral surface of the drive pulley 13 a spiral pulley groove $13_1$ is formed and both the inner cables 5i and 6i are wound around the pulley groove $13_1$. Accordingly, both the inner cables 5i and 6i are wound around the drive pulley 13 for about two rotations (720 degrees), respectively, in such a manner as to move away from an axially central portion of the pulley groove $13_1$ of the drive pulley 13 in an axial direction toward right and left axially end surfaces of the drive pulley 13 so that the inner cables 5i and 6i are wound away from each other. On the right and left end surfaces of the drive pulley 13, spiral shaped wire fixing grooves $13_2$ and $13_3$ which are respectively connected to each axial end of the pulley groove $13_1$ are formed. Each of the wire fixing grooves $13_2$ and $13_3$ is formed to extend arcurately alongabout 450 degrees of each end surface and pin holes $13_4$ and $13_5$ are respectively formed on the right and left end surfaces of the drive pulley 13 at the ends of the wire fixing grooves $13_2$ and $13_3$. Pins 14 and 15 which are fixedly attached to tip ends of both of the inner cables 5i and 6i by casting or caulking are inserted and fitted into the pin holes $13_4$ and $13_5$, and both of the inner cables 5i and 6i extending from the pins 14 and 15 are inserted and fitted into one of the wire fixing grooves $13_2$ and $13_3$ by press-inserting, and thereafter the inner cables 5i and 6i are wound around the pulley groove $13_1$.

Figure 5:
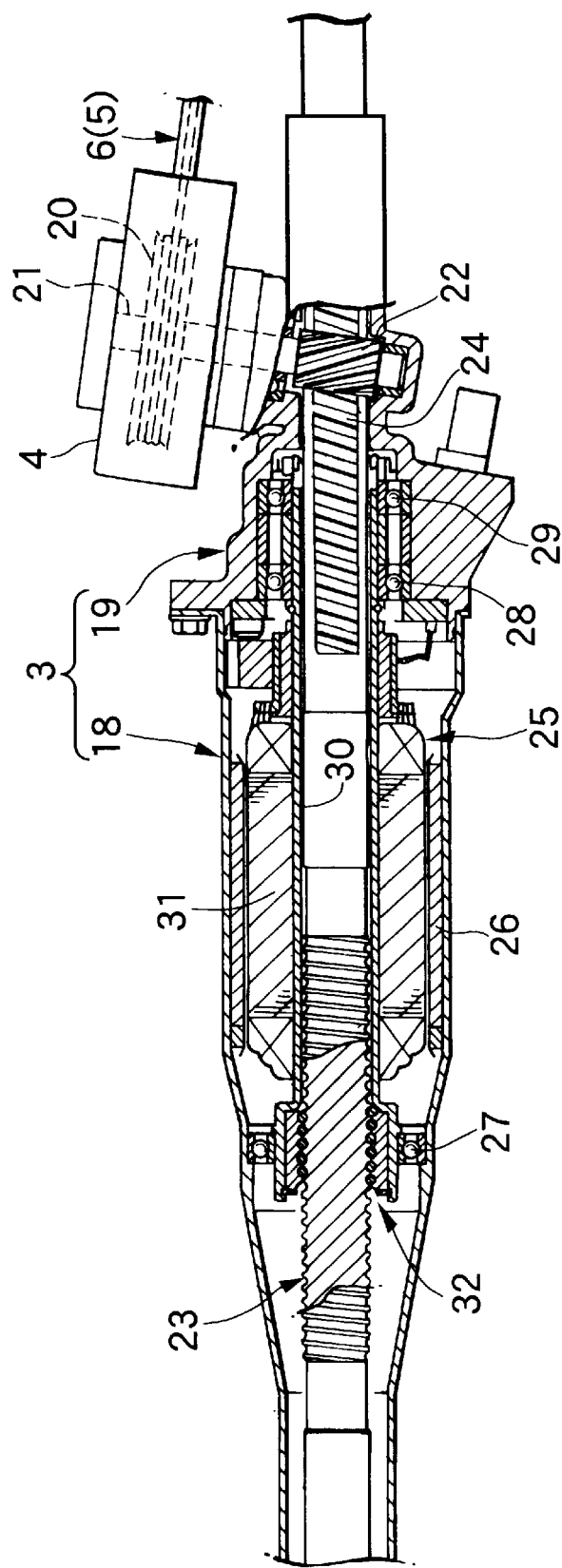
FIG. 5 is an enlarged cross sectional view taken along a line 5—5 in FIG. 1.

As shown in FIG. 5, the gear box 3 is separated into a left chamber 18 for receiving a motor and a right chamber 19 for receiving a rack and pinion gear and the driven pulley housing 4 is supported in the chamber 19 for receiving the rack and pinion gear. A rotary shaft 21 which is integrally formed with a driven pulley 20 provided within the driven pulley housing 4 extends into the chamber 19 for receiving the rack and pinion gear. A pinion 22 is fixed to the extended portion of the rotary shaft 21. Within the gear box 3, a steering rod 23 which has both ends connected to the tie rods $8_L$ and $8_R$ is slidably supported in a right and left direction. The pinion 22 engages a rack 24 formed on the steering rod 23.

The other ends of the inner cables 5i and 6i of the two Bowden wires 5 and 6 are fixedly wound around the outer periphery of the driven pulley 20 and the corresponding ends of the outer tubes 5o and 6o are fixed to suitable positions of the driven pulley housing 4. The fixing structure of the other ends of the inner cables 5i and 6i with respect to the driven pulley 20 is substantially the same as that with respect to the drive pulley 13 described above. Accordingly, further explanation thereof is omitted.

A motor 25 for a power steering operation received in the motor receiving chamber 18 of the gear box 3 comprises a stator 26 fixed to the inner peripheral surface of the motor receiving chamber 18, a motor output shaft 30 fitted into the outer periphery of the steering rod 23 in such a manner as to be rotatably supported to the inner peripheral surface of the motor receiving chamber 18 through three ball bearings 27, 28 and 29, and a rotor 31 fixedly attached to the motor output shaft 30 in such a manner as to be opposite to the stator 26. A ball screw mechanism 32 is provided between the inner peripheral surface of the motor output shaft 30 and an outer peripheral surface of the steering rod 23, thereby generating a steering operation assisting force by rotating the motor output shaft 30 in normal and reverse directions by driving the motor 25, the steering operation assisting force oscillatingly driving the steering rod 23 in the right and left direction.

Next, an operation of the embodiment in accordance with the present invention having the above described structure will be explained.

For example, when the steering wheel 1 is rotated in a left direction in order to turn the vehicle to left, the rotating shaft 12 rotates in a clockwise direction together with the drive pulley 13 as viewed in FIG. 2. As a result of this, the inner cable 5i of the Bowden wire 5 is drawn and the inner cable 6i of the Bowden wire 6 is loosened so that the rotation of the drive pulley 13 is transmitted to the driven pulley 20 to rotate the rotary shaft 21 and the steering operation torque is transmitted to the rack 24 via the pinion 22.

When the steering operation torque is detected by a detecting means not illustrated, the detected value of the steering operation torque is calculated in an electronic control unit together with other control signals and the motor 25 for the power steering operation is driven on the basis of the calculated results. Accordingly, the steering rod 23 is driven by the motor 25 for the power steering operation in the right and left direction so that the operation of the steering wheel 1 by the driver is assisted.

As mentioned above, since the steering wheel 1 and the gear box 3 are connected to each other by the flexible Bowden wires 5 and 6, the steering wheel 1 can be disposed at an optional position with respect to the gear box 3 so that the range of design choices can be greatly widened. Accordingly, for example, the gear box 3 may be commonly used in a vehicle having a right side steering wheel and a vehicle having a left side steering wheel and structures of a tilting mechanism and a telescopic mechanism of the steering wheel 1 can be simplified.

Further, since the conventional steering shaft for connecting the steering wheel 1 and the gear box 3 can be eliminated, in addition to a more comfortable riding condition due to a reduction in transmission of vibrations of the gear box 3 and the engine to the steering wheel 1, a larger space below the legs of the driver can be provided to improve operator comfort. Further, a large shock absorbing effect can be obtained since the steering wheel 1 can be moved forward of the vehicle body at a sufficient stroke relative to the vehicle body in the event of a collision.

Since a maximum angle of rotation of the steering wheel 1 is generally set to one-half rotations in each of the right and left direction from a neutral position (540 degrees), in the above described cable-type steering device when the steering wheel 1 is rotated to the maximum limit, the inner cables 5$i$ and 6$i$ which are respectively wound around the pulley groove 13$_1$ of the drive pulley 13 at two rotations in the neutral position are changed to a state that one of the inner cables 5$i$ and 6$i$ is wound around the pulley groove 13$_1$ of the drive pulley 13 at three and half rotations and the other is wound around the pulley groove 13$_1$ at only one-half rotation. Thus, in the above described conventional cable-type steering device when the winding amount of the inner cables 5$i$ and 6$i$ with respect to the drive pulley 13 is reduced, the tensional force of the inner cables 5$i$ and 6$i$ is directly applied to the portion fixed to the pins 14 and 15 so that there is a possibility that durability or expected service life of the fixed portion will be reduced.

However, in accordance with the present embodiment, since the end portions of the inner cables 5$i$ and 6$i$ connected to the pins 14 and 15 are inserted and fitted to the inside of the wire fixing grooves 13$_2$ and 13$_3$ by press-fitting, a great friction force is effected between the inner cables 5$i$, 6$i$ and the wire fixing groove 13$_2$, 13$_3$ in that portion. As a result of this, the tensional force of the inner cables 5$i$ and 6$i$ does not become directly effected to the portion of the cables fixed to the pins 14 and 15 and durability of the fixed portion is improved. Further, since the wire fixing grooves 13$_2$ and 13$_3$ are formed as a spiral shape having a center of the rotary shaft 12, the wire fixing grooves 13$_2$ and 13$_3$ each having a sufficient length are formed within the limited area of the end surface of the drive pulley 13 so that great frictional force can be applied to the inner cables 5$i$ and 6$i$ without adverse effect.

Furthermore, the durability of the fixed portion of the other end of each of the inner cables 5$i$ and 6$i$ with respect to the driven pulley 20 can also be improved by the same structural arrangement.

Figure 6:
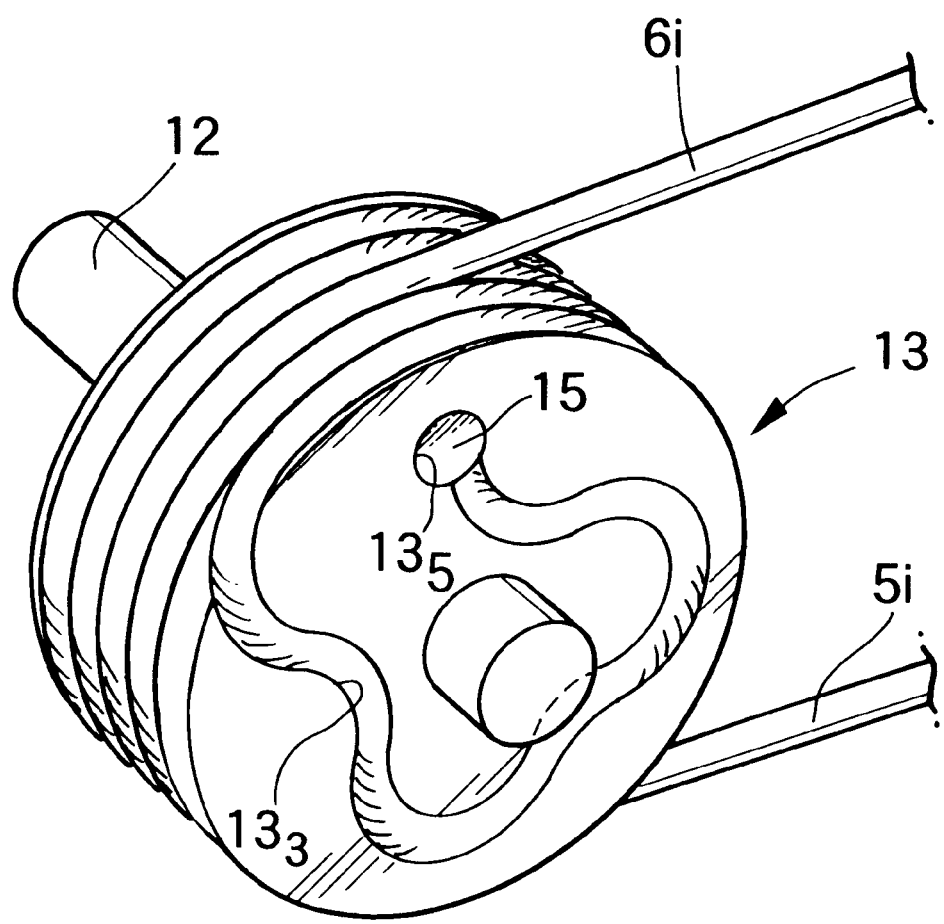
FIG. 6 is a perspective view corresponding to FIG. 4 in accordance with a second embodiment of the present invention.

Next, a second embodiment in accordance with the present invention will be explained with reference to FIG. 6.

The second embodiment has a different shape of the wire fixing grooves 13$_2$ and 13$_3$ in contrast with the first embodiment. In this embodiment, the wire fixing grooves 13$_2$ and 13$_3$ are formed as a wavy pattern along 360 degrees so as to surround the rotary shaft 12. This structure will also provide the same operation and advantageous effect as the first embodiment.

Figure 7:
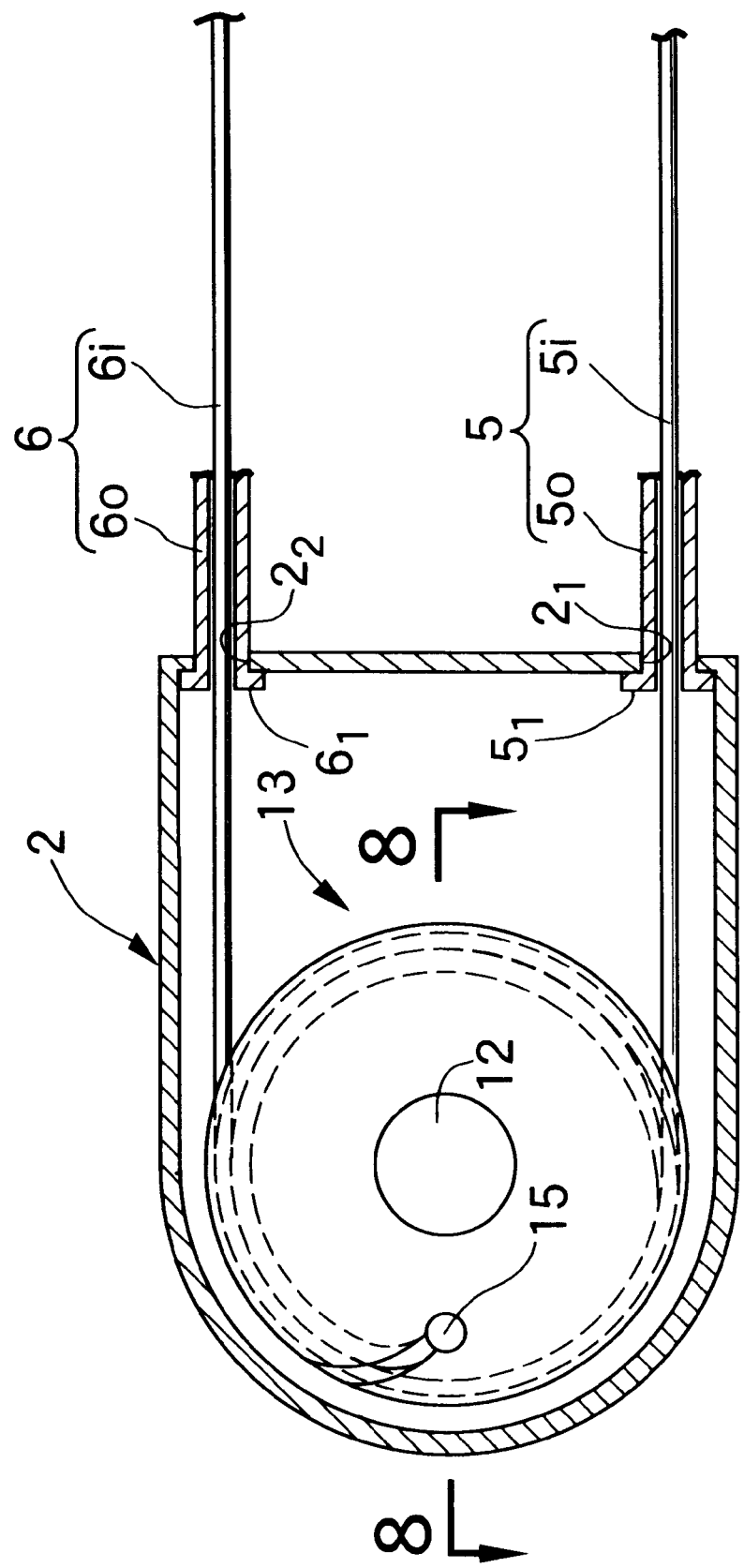
FIG. 7 is a view corresponding to FIG. 2 of a third embodiment of the invention.
Figure 8:
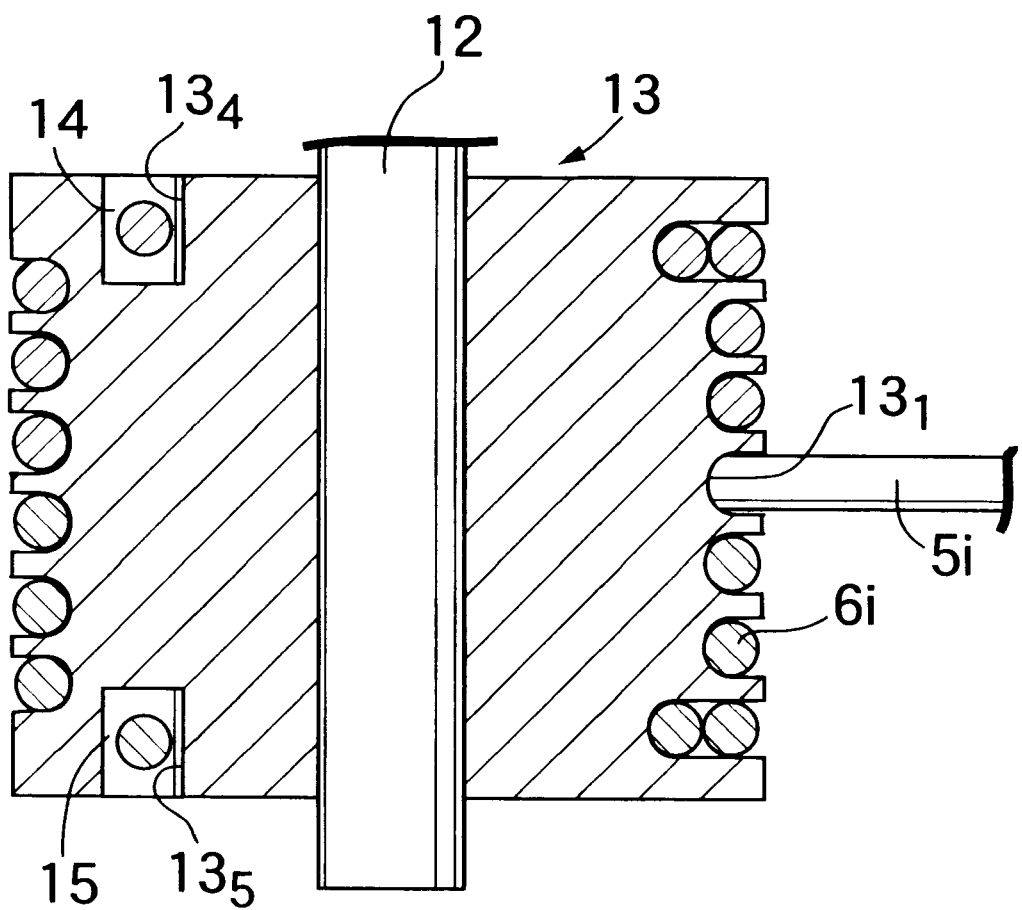
FIG. 8 is a cross sectional view taken along a line 8—8 in FIG. 7.
Figure 9:
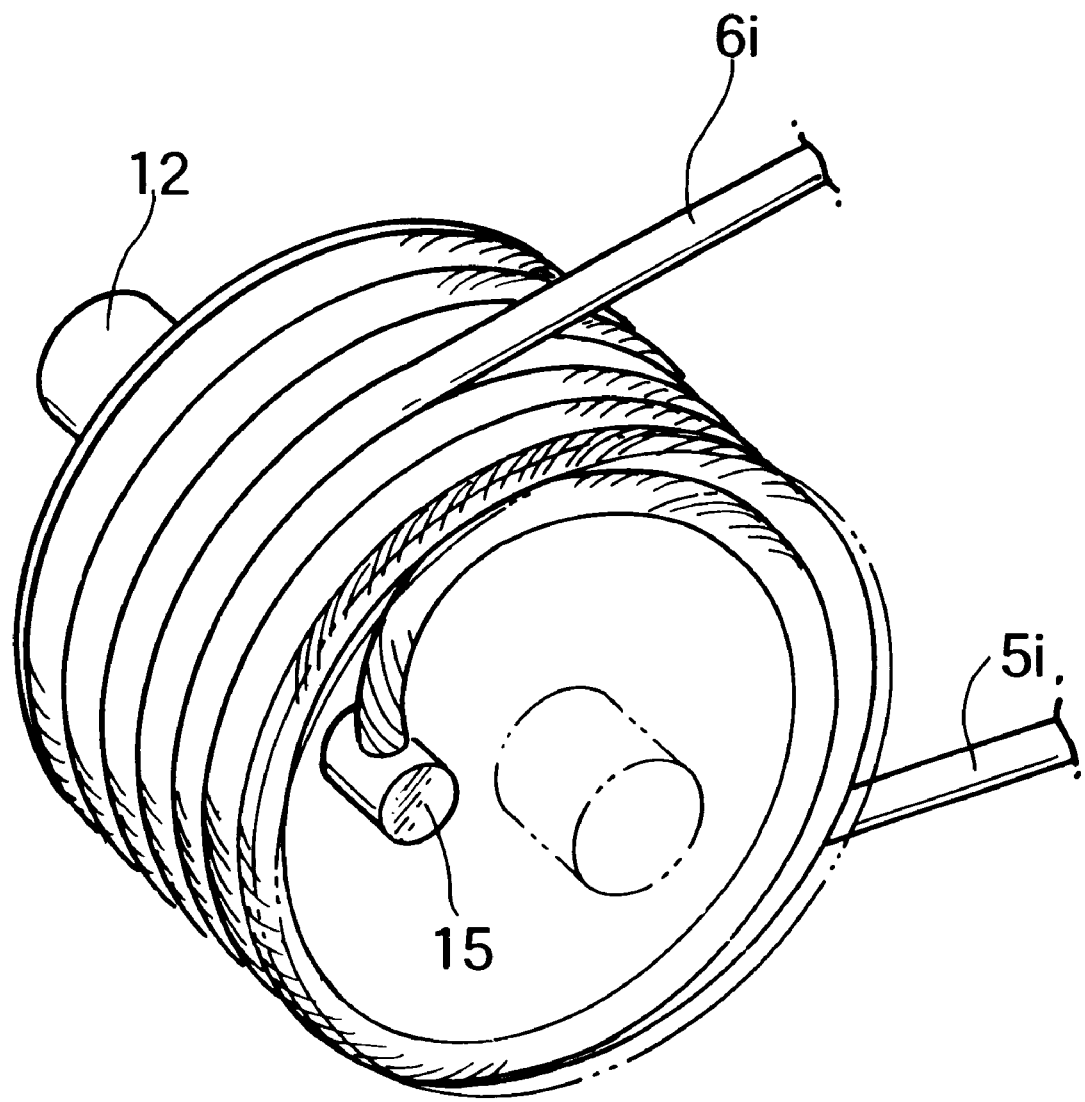
FIG. 9 is a perspective view of the drive pulley of FIG. 7.

Next, a third embodiment in accordance with the present invention will be explained with reference to FIGS. 7 to 9.

In the third embodiment, on the outer peripheral surface of the drive pulley 13 a spiral pulley groove 13$_1$ is formed and both inner cables 5$i$ and 6$i$ are wound around the pulley groove 13$_1$. Accordingly, both of the inner cables 5$i$ and 6$i$ are wound around at four and one-fourth rotations, respectively in such a manner as to move away from a central portion of the pulley groove 13$_1$ of the drive pulley 13 in an axial direction toward right and left end surfaces of the drive pulley 13$_1$ respectively, so that the inner cables 5$i$ and 6$i$ move apart from each other. In this structure, by forming a depth of the pulley groove 13$_1$ of the drive pulley 13 partially deeper than the other portions, the inner cables 5$i$ and 6$i$ can be wound around in such a manner that the last three-fourths rotation portion of each cable 5$i$, 6$i$ is doubly wound around its preceding portion so as to be superposed radially of the drive pulley 13. Pins 14 and 15 which are fixed to tip ends of both the inner cables 5$i$ and 6$i$ by casting or caulking are inserted and fitted into the pin holes 13$_4$ and 13$_5$ formed in right and left end surfaces of the drive pulley 13 so that the tip ends of the both inner cables 5$i$ and 6$i$ are fixed to the drive pulley 13.

Since a limited rotating angle of the steering wheel 1 is generally set to one and half rotation in each of the right and left directions from a neutral position (540 degrees), in the case that the steering wheel 1 is rotated to the maximum limit, the inner cables 5$i$ and 6$i$ which are respectively wound around the pulley groove 13$_1$ of the drive pulley 13 at four and one-fourth rotations in the neutral position are changed to a state that one of the inner cables 5$i$ and 6$i$ is wound around the pulley groove 13$_1$ of the drive pulley 13 at five and three-fourths rotations and the other is wound around the pulley groove 13$_1$ at two and three-fourths rotations.

Generally, in the above described conventional cable-type steering device, when the winding amount of the inner cables 5$i$ and 6$i$ with respect to the drive pulley 13 is reduced, the tensional force of the inner cables 5$i$ and 6$i$ becomes directly applied to the portion fixed to the pins 14 and 15 so that there is a possibility that durability or expected service life of the fixed portion will be reduced.

However, in accordance with the present embodiment, since the end portion of each of the inner cables 5$i$ and 6$i$ in the unwound side is wound around the pulley groove 13$_1$ at two or more rotations (two and three-fourths rotations) even if the steering wheel 1 is rotated to the maximum limit, a substantial friction force is applied between the inner cables 5$i$, 6$i$ and the pulley groove 13$_1$. As a result of this, a tensional force of the inner cables 5$i$ and 6$i$ does not directly affect to the portions of the inner cables fixed to the pins 14 and 15 and durability of the fixed portions can be improved.

Further, the durability of the fixed portion of the other end of the inner cables 5$i$ and 6$i$ with respect to the driven pulley 20, can also be increased by the same structural arrangement of a radially receding driven pulley cable groove.

Figure 10:
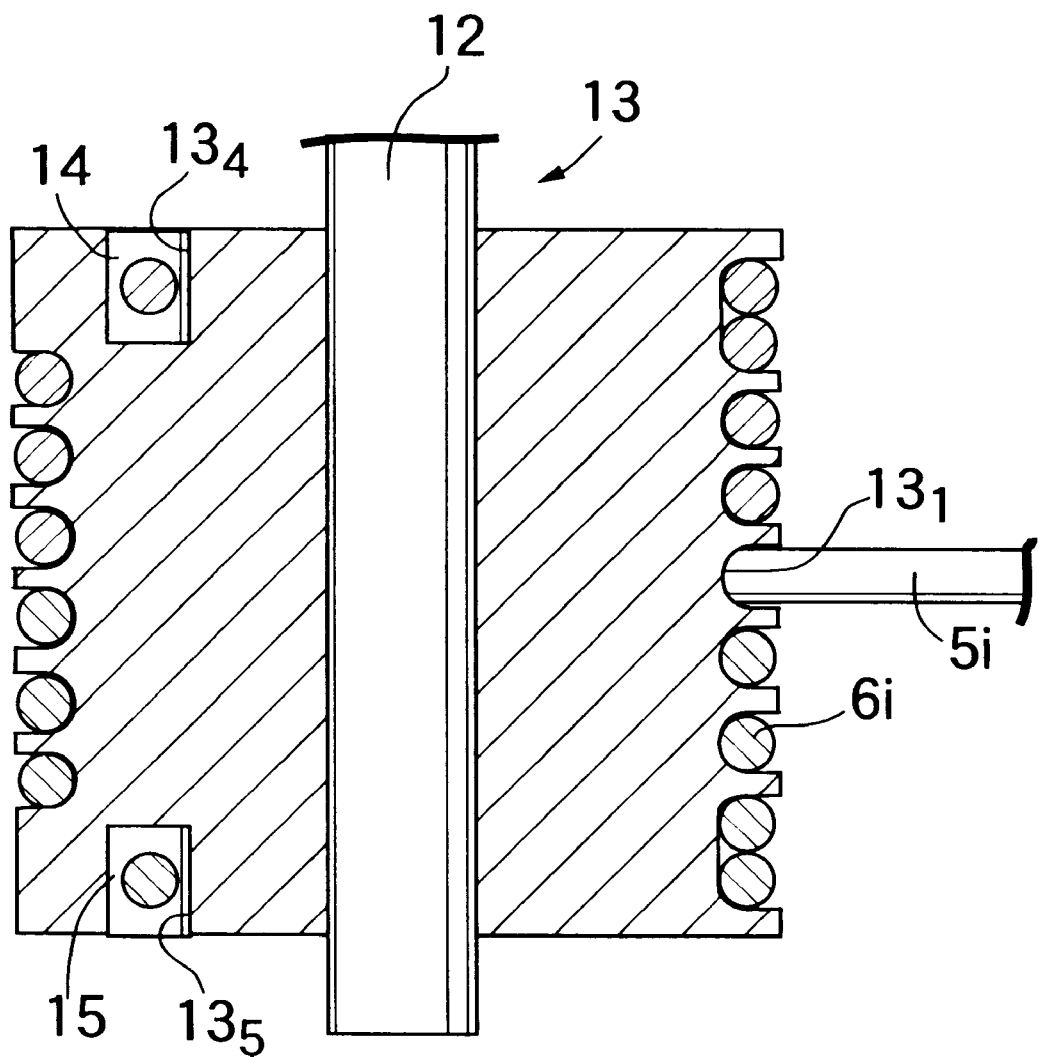
FIG. 10 is a view corresponding to FIG. 8 in accordance with a fourth embodiment of the present invention.

Next, a fourth embodiment in accordance with the present invention will be explained with reference to FIG. 10.

The fourth embodiment is a modification of the third embodiment, in which the width of the groove in both axial end portions of the pulley groove 13$_1$ is widened and the inner cables 5i and 6i are doubly wound around the widened portion in an axial direction of the drive pulley 13. In accordance with the present embodiment, since the end portions of the inner cables 5i and 6i in the unwound side in the case that the steering wheel 1 is rotated to its maximum limited position remain wound around the pulley groove $13_1$ at two or more rotations, a great friction force can be generated. Further, since the portions in which the inner cables 5i and 6i are doubly wound around are in contact with each other, a great frictional force is generated and the same effect as that in the third embodiment can be obtained.

Further, since the end portions of the inner cables 5i and 6i in the unwound side in the case that the steering wheel 1 is rotated to the maximum limit are doubly wound around at three-fourths rotation, a great friction force can be applied to a portion in which the last windings of the inner cables 5i and 6i contact each other. As a result of this, a tensional force on the inner cables 5i and 6i does not directly effect the portions fixed to the pins 14 and 15 and durability of the fixed portions can be improved. As mentioned above, since the structure is simple in which a portion of the inner cables 5i and 6i is doubly wound around so adjacent windings of each inner cable contact each other, special parts and are not required the structure can be realized with a low cost.

As mentioned above, although different embodiments in accordance with the present invention are described in detail, the present invention may be modified in the scope of the invention as defined by the claim without departing from the invention.

For example, in the first and second embodiments, the wire fixing groove $13_2$ and $13_3$ are accurately formed along an angle of 450 degrees and the 360 degrees, respectively, however, this central angle may be set to 90 or more degrees and still obtain a sufficient improvement over the above described conventional cable-type steering device. Further, in the third and fourth embodiments, if the end portions of the inner cables 5i and 6i in the unwound side are wound around the pulley groove $13_1$ at two or more rotations in the case that the steering wheel 1 is rotated to the maximum limited position, a significant improvement can be obtained even if the end portions of the inner cables 5i and 6i are not doubly wound upon an adjacent winding (that is, even if the inner cables 5i and 6i do not contact an adjacent winding). Still further, if at least a portion of the inner cables 5i and 6i in the unwound side is doubly wound to contact an adjacent winding in the case that the steering wheel 1 is rotated to the maximum limited position, a substantial improvement can be obtained even if the end portions of the inner cables 5i and 6i are wound around at less than two rotations.

What is claimed is:

1. A cable type steering device, comprising:
    a drive pulley connected to a steering wheel and having a spiral pulley groove;
    a driven pulley connected to a gear box which steers a wheel and having a spiral pulley groove;
    a wire having two ends which are respectively wound around the spiral pulley groove of the drive pulley and the spiral pulley groove of the driven pulley, said wire transmitting a steering torque input to the steering wheel to the gear box;
    pins respectively fixed to the ends of said wire;
    pin holes respectively formed in an end surface of said drive pulley and an end surface of said driven pulley and fixing said pins; and
    a wire fixing groove formed on each of said end surfaces of said drive pulley and said driven pulley at least along a central angle of 90 degrees, each wire fixing groove connecting one of said pin holes to one of said pulley grooves, wherein a portion of each end of said wire extending from said pins is press-inserted into one of said wire fixing grooves so that a tensional force of the wire can be supported by a frictional force generated between the wire and the wire fixing groove.

2. A cable-type steering device as claimed in claim 1, wherein said wire fixing groove is formed as a spiral shape.

3. A cable-type steering device as claimed in claim 1, wherein said wire fixing groove is formed as a wavy pattern.

4. A cable type steering device, comprising:
    a drive pulley connected to a steering wheel and having a spiral pulley groove;
    a driven pulley connected to a gear box which steers a wheel and having a spiral pulley groove;
    a wire having two ends which are respectively wound around the spiral pulley groove of the drive pulley and the spiral pulley groove of the driven pulley, said wire transmitting a steering torque input to the steering wheel to the gear box;
    pins respectively fixed to the ends of said wire; and
    pin holes respectively formed in said drive pulley and said driven pulley and fixing said pins,
wherein said wire is wound around one of said spiral pulley grooves at least two times so as to be superposed in a radial direction of said drive and driven pulleys when the steering wheel is rotated to its maximum limit of rotation in a direction tending to unwind said wire from said one spiral pulley groove.

5. A cable type steering device, comprising:
    a drive pulley connected to a steering wheel and having a spiral pulley groove;
    a driven pulley connected to a gear box which steers a wheel and having a spiral pulley groove;
    a wire having two ends which are respectively wound around the spiral pulley groove of the drive pulley and the spiral pulley groove of the driven pulley, said wire transmitting a steering torque input to the steering wheel to the gear box;
    pins respectively fixed to the ends of said wire; and
    pin holes respectively formed in said drive pulley and said driven pulley and fixing said pins, wherein at least one end portion of said wire is doubly wound around one of said spiral pulley grooves in an axial direction of said drive and driven pulleys when the steering wheel is rotated to its maximum limit of rotation in a direction tending to unwind said wire from said one spiral pulley groove.

6. A cable-type steering device as claimed in claim 5, wherein said at least one end portion of said wire is doubly wound in a radial direction of the drive pulley or the driven pulley.

7. A cable-type steering device as claimed in claim 5, wherein said at least one end portion of said wire is doubly wound in an axial direction of the drive pulley or the driven pulley.

* * * * *